United States Patent [19]

Strock

[11] Patent Number: 4,471,806

[45] Date of Patent: Sep. 18, 1984

[54] FUEL DELIVERY SYSTEM HAVING THERMAL CONTRACTION COMPENSATION

[76] Inventor: Dennis J. Strock, 6433 Summerall Dr., Woodridge, Ill. 60517

[21] Appl. No.: 387,953

[22] Filed: Jun. 14, 1982

[51] Int. Cl.$^3$ .......................... F16K 17/00; F16D 31/02

[52] U.S. Cl. .................................. 137/614.2; 137/460; 60/413; 60/418

[58] Field of Search ............ 137/460, 498, 101, 614.2, 137/825, 826; 60/413, 418; 138/30, 31

[56] References Cited

U.S. PATENT DOCUMENTS

| | | | |
|---|---|---|---|
| 2,700,488 | 1/1955 | Rafferty | 138/31 |
| 2,952,387 | 9/1960 | Fowler et al. | 137/460 |
| 2,952,388 | 9/1960 | Defers | 137/460 |
| 2,952,390 | 9/1960 | Fowler et al. | 137/460 |
| 3,812,675 | 5/1974 | Cochrane | 60/413 |
| 3,915,186 | 10/1975 | Thomas | 60/418 |
| 4,192,337 | 3/1980 | Alderson et al. | 60/413 |
| 4,332,270 | 6/1982 | Budecker | 60/418 |

FOREIGN PATENT DOCUMENTS

| | | | |
|---|---|---|---|
| 561694 | 9/1932 | Fed. Rep. of Germany | 138/31 |
| 731031 | 6/1955 | United Kingdom | 138/31 |

*Primary Examiner*—A. Michael Chambers

*Attorney, Agent, or Firm*—Hill, Van Santen, Steadman & Simpson

[57] ABSTRACT

A fuel delivery system has a leak detector which responds to a low pressure condition in the delivery line for severely restricting the rate of flow of fluid to the delivery line. A temperature contraction compensation accumulator compensates for the contraction of fuel in the delivery line for maintaining the pressure of the delivery line above a minimum value, to avoid erroneous triggering of the leak detector into its slow flow mode in response to thermal contraction of the fuel.

5 Claims, 5 Drawing Figures

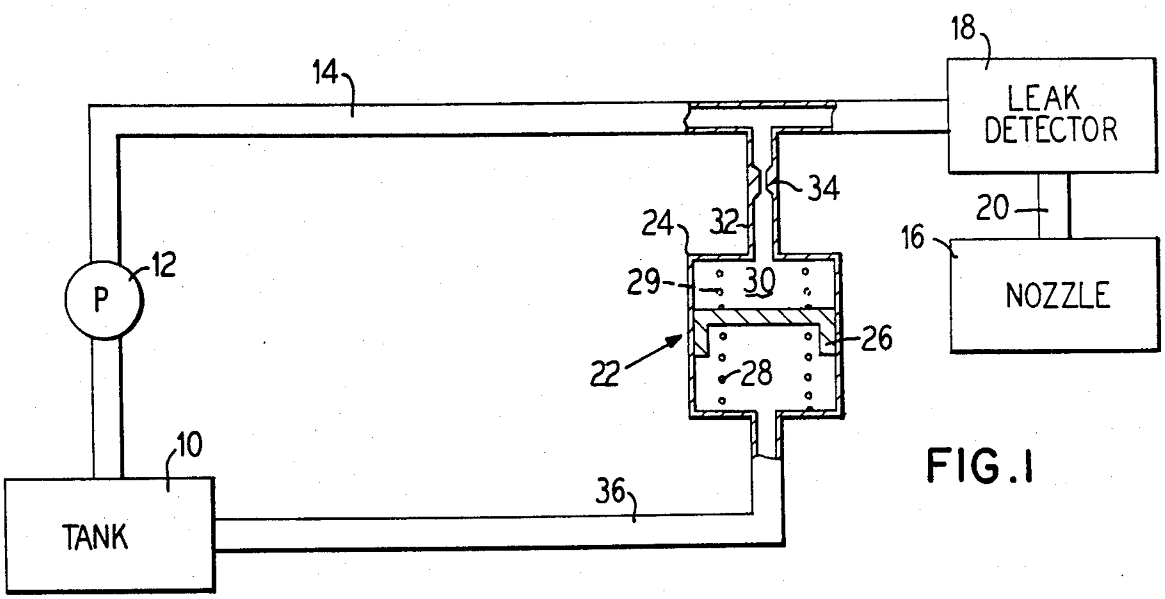
FIG. 1
FIG. 2
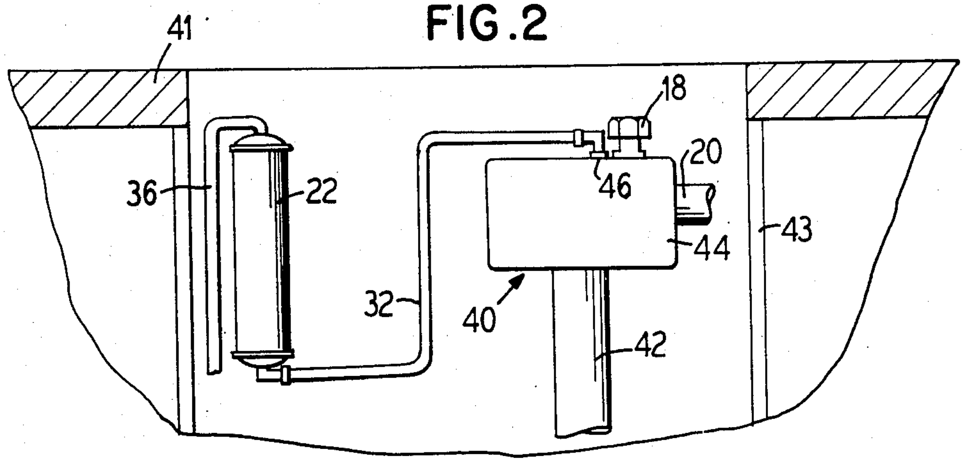
FIG. 3
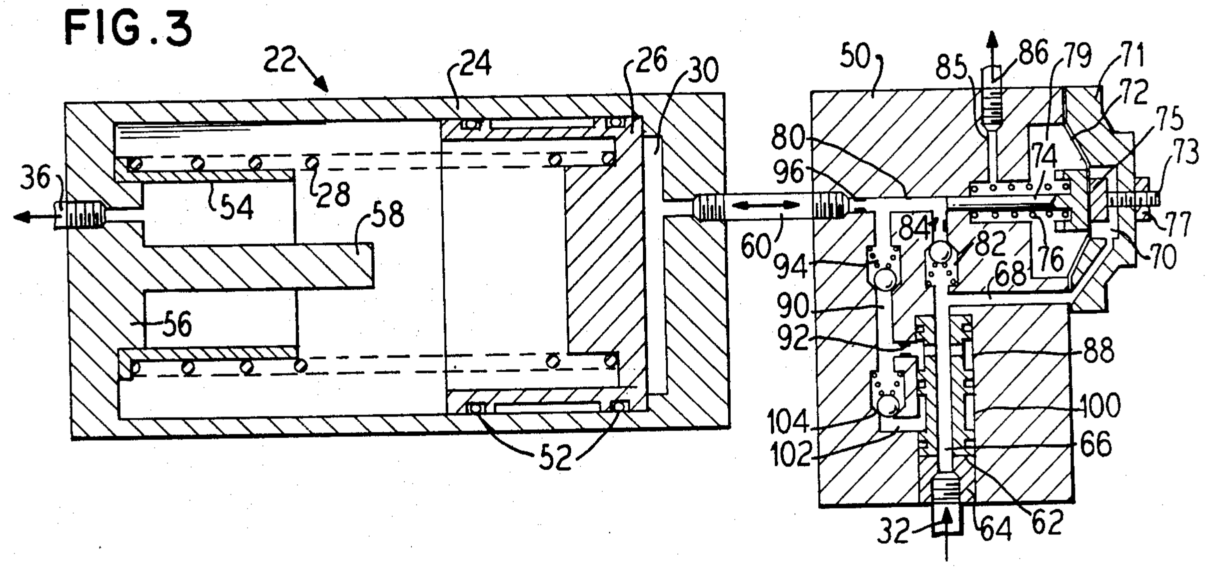

FUEL DELIVERY SYSTEM HAVING THERMAL CONTRACTION COMPENSATION

BACKGROUND OF THE INVENTION

1. Field of the Invention

The present invention relates to fuel delivery systems, and more particularly to such systems equipped with leak detectors.

2. The Prior Art

Most fuel delivery systems for the delivery of gasoline and other motor fuels from service stations employ pressurized fueling systems equipped with leak detectors. The function of the leak detector is to determine when fuel is leaking from the pressurized delivery line and to severely restrict the flow rate of fluid in the delivery system when such a leak is detected. The "slow flow" mode signals the presence of the leak to the operator.

The use of leak detectors is a necessary safety measure in service station fueling systems, since undetected leaks represent a serious safety hazard. However, use of the leak detectors leads to operational problems by restricting delivery flow of fuel under conditions in which there is no leak of fuel from the pressurized system. The leak detector responds to pressure of the fueling system line downstream of the fuel pump, and including the fuel dispenser which is typically located at a service station island. As long as line pressure is maintained above a predetermined level, the leak detector permits normal function of the fueling system. If, however, the leak detector senses a sufficient loss of pressure in the fuel system distribution line, the leak detector functions to restrict the flow rate of the fueling system.

During periods of cold weather, the normal operation of the leak detector is upset, due to thermal contraction of the fuel in the delivery lines. This contraction induces a drop in line pressure which is sufficient to trip the leak detector into its reduced flow mode. When this condition occurs, it frustrates delivering fuel from the fuel delivery system, and in some cases causes the fuel system delivery operator to disconnect the leak detector entirely, which, while permitting faster fuel delivery, creates the possibility of a safety hazard due to undetected actual leaks.

While it is possible to take special steps to prevent the leak detector from malfunctioning in response to thermal contraction, it requires that the pump be turned on for a time interval before the nozzle of the delivery hose is opened, to allow the distribution line to refill and reach normal pressure at its reduced temperature. However, this introduces a delay in operation, and when a person operating the island dispenser opens the hose nozzle before the leak detector has sufficiently completed its cycle to allow normal flow, the leak detector goes into a slow flow mode. The early opening of the nozzle prevents the distribution line pressure from rising to a level sufficient to indicate to the leak detector that there is no leak in the distribution line. Of course, as long as the nozzle of the delivery hose is held open, the pressure in the delivery line remains low, so that the leak detector is never able to recover from its slow flow mode.

From the standpoint of a service station operator, the cold weather malfunctioning of fuel delivery systems incorporating leak detectors is highly disruptive, and as noted earlier, often results in removal of the leak detector to eliminate the problem. Also, in the case of self service islands, particularly those with several nozzles connected to a common delivery line at several delivery locations, it has not been possible to educate consumers to the need for maintaining the pump on for a period of time before opening any nozzle, in order to pressurize the delivery line and allow the leak detector to complete its operational cycle.

BRIEF DESCRIPTION OF THE INVENTION

It is a principal object of the present invention to provide a method and apparatus for allowing the proper operation of leak detector equipped fuel delivery systems in cold weather, without the need for interposing delays in any of the operation steps. This allows normal fuel delivery, even in extremely cold weather, while permitting the leak detector to maintain its normal operation. The invention avoids the problem which induces service station operators to disconnect or remove leak detectors, and therefore represents a significant increase in the safety of fuel delivery systems incorporating the present invention.

The object of the present invention is achieved by adding a pressurized temperature contraction compensation or TCC accumulator to the fueling system, so that reduction in volume of the fuel in the distribution line due to low temperatures, is compensated for by adding a volume of fuel to the distribution line. As long as there are no distribution line leaks, this addition of fuel under pressure maintains the line pressure level above that which would allow the leak detector to trip into its slow flow mode.

In order to avoid masking small leaks of fuel from the distribution line, the TCC accumulator is designed to provide only such quantity of fuel and rate of flow which is required to compensate for temperature effects. The leak detector function is maintained.

In accordance with one embodiment of the present invention, the TCC accumulator takes the form of a variable volume cylinder attached to the delivery line, with a spring loaded piston adapted to normally maintain the pressure in the cylinder within predetermined limits. In response to thermal contraction of fuel in the delivery line, the volume of the cylinder contracts, making a quantity of fuel available to the delivery line in order to maintain its pressure.

Variations of the invention allow the thermal contraction compensation unit to be placed in any convenient position within the fuel delivery system, such as at the pump, at the leak detector, or at the service station island dispenser where the delivery hose nozzle is located.

These and other objects and advantages of the present invention will become manifest by an inspection of the following description and the accompanying drawings.

BRIEF DESCRIPTION OF THE DRAWINGS

Reference will now be made to the accompanying drawings, in which:

FIG. 1 is a side view, partly in cross section, showing a fuel delivery system incorporating an illustrative embodiment of the present invention;

FIG. 2 is a side view of an example of a fuel delivery system incorporating the present invention;

FIG. 3 is a cross-sectional view of an alternative embodiment of the present invention shown in one operating position;

DESCRIPTION OF THE PREFERRED EMBODIMENTS

Figure 4:
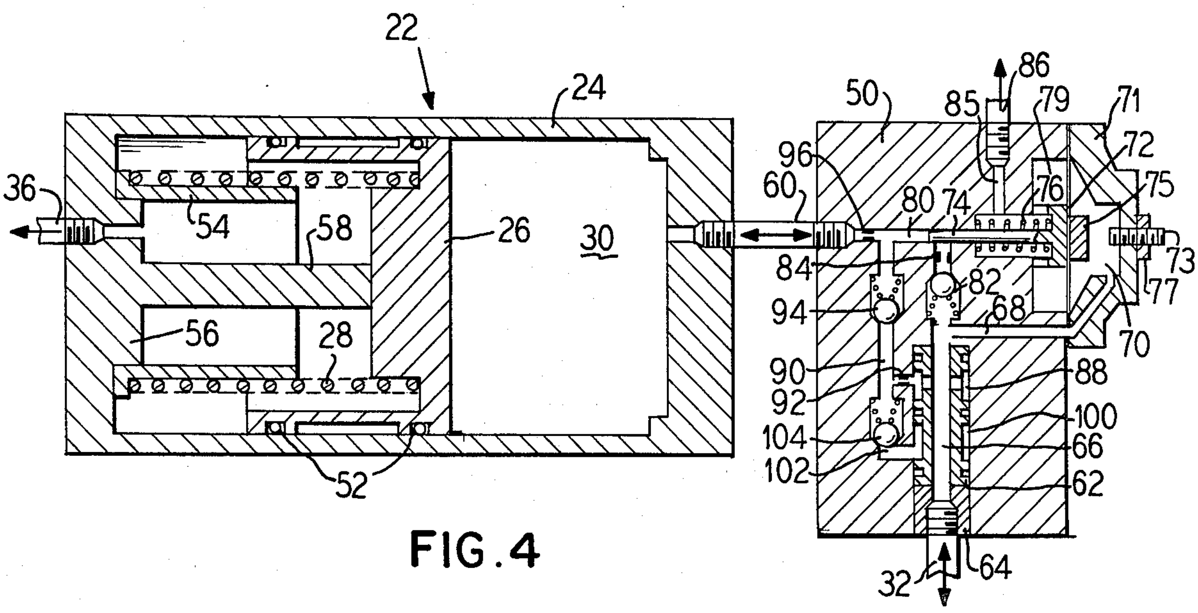
FIG. 4 is a cross-sectional view of the apparatus of FIG. 3 shown in a second operating position.

Referring to FIG. 1, a fuel delivery system is shown diagrammatically. A tank 10 constitutes the fuel reservoir, and a pump 12 is adapted to pump fuel from the tank 10 into a line 14. A leak detector 18 is interposed in this line, and is adapted to restrict fuel flow through the line 14 under conditions in which there is a leak of fluid from the line 20, which interconnects the leak detector 18 with the nozzle 16. Such leak detectors are commercially available, such as those marketed by the Red Jacket Division of the Marley Company, for use with remote gasoline pumps. Such a leak detector has a pressure operated diaphragm with a connected valve stem or poppet which controls the rate of flow of fluid through the leak detector. When the pump 12 is first turned on and the pressure in the delivery line 20 is below 1 psi, such as after a long period (overnight) during which the pump remains off, fluid flowing through the leak detector 18 is subsequently restricted to a flow rate of about three gallons per hour. If there is no leak in the line 20, the pressure rises relatively slowly in the line 20, and the diaphragm in the leak detector 18 responds, when the line pressure increases to a preset point, by moving its valve stem so that full flow is permitted through the leak detector. At this point, the nozzle 16 may be opened, and the pressure in the line 20 does not drop, because the leak detector 18 is fully opened.

When the nozzle 16 is opened prematurely, before the line pressure rises above the preset point, the flow rate through the leak detector 18 is restricted. The pressure in line 20 is greatly reduced due to the open nozzle, and the diaphragm in the leak detector 18 responds to the difference in pressure between the lines 14 and 20 by moving its valve to a position where the flow is severely restricted. Typically, the flow rate under such conditions is restricted to about three gallons per minute, which is much less than the normal flow rate, signifying to the operator that a leak may exist in the line 20.

Under warm weather conditions, it normally takes two to five seconds for the pressure in the line 20 to rise with a flow rate of three gallons per hour, to the point where the diaphragm in the leak detector 18 opens the valve fully. Leaks from the line 20 which are less than three gallons per hour still permit the pressure in the line 20 to rise and trip the leak detector 18 to its full on condition, but operation then takes longer, because of the volume of fuel that leaks out during this interval. This increased time period signifies a low level leak to the operator.

Once the leak detector has gone through its cycle successfully, the delivery line 20, absent any leaks, normally remains pressurized above the full flow preset pressure of about 8–10 psi, so that when the pump is turned off for short periods, as between frequent dispensing operations, the high pressure in the line enables the leak detector valve to remain fully open.

The construction and operation of the leak detectors described above are well known to those skilled in the art, and therefore, need not be described in detail herein.

During cold weather, the line 20 is considerably colder than the fuel in the tank 10, since the latter is deeply buried, and much or all of the line 20 is at or near the surface. Then thermal contraction of the fluid in the delivery line can cause the pressure of the line 20 to fall, causing the leak detector to cycle through its leak-testing cycle of operation the next time the pump is turned on. The condition is aggravated during severely cold weather, in which only a short off-time (of the pump) causes a recycling of the leak detector, and the time required to complete the leak test cycle becomes longer. When the delivery nozzle is opened prematurely, only the slow flow mode is available.

The temperature contraction compensation or TCC accumulator 22 is provided to overcome this problem. It consists of a cylinder 24 with a piston 26 mounted in sliding relationship within the cylinder 24 and urged in an upward direction by a compression coil spring 28 located between the piston 26 and one end of the cylinder 24. The upper chamber 30 of the cylinder constitutes a variable volume, which depends on the position of the piston 26. It is connected to the line 14 by a line 32 which incorporates a flow restrictor 34 to limit the rate of flow of fluid into and out of the chamber 30. The bottom of the cylinder 24 is vented by a line 36 to the tank 10, so that pressure below the piston is substantially constant.

The maximum volume of the chamber 30 is selected in accordance with the volume within the line 20, and in accordance with the maximum temperature difference between line 20 and that of the tank 10, which is to be compensated for. In operation, when the pump 12 is first energized, the leak detector operates in the normal manner, so that the pressure on the line 20 is allowed to rise, and the leak detector 18 is caused to trip to its full flow condition. The pressure in the line 14 causes fluid to flow from the line 14 through the line 32 to the TCC accumulator 22. The line 36 allows the bottom of the cylinder to be vented to the tank 10, so that only the force of the spring 28 must be overcome by the pressure of the fluid in the lines 14 and 32 in order to fill the accumulator 22.

When the pump 12 is turned off, between deliveries, the accumulator 22 maintains the pressure on the lines 14 and 20 high enough to keep the leak detector 18 in its full flow mode, as long as there is no leak present in the line 20. The TCC accumulator 22 communicates with the line 14 directly, and with the line 20 through the open leak detector valve. The volume in the chamber 30 is sufficient to accommodate the contraction of volume in the line 20 under cold weather conditions, and the pressure is maintained above the leak detector recycle point by the force of the spring 28, thus eliminating unnecessary cycling of the leak detector during cold weather. The flow restrictor 34 causes the chamber 30 to fill and exhaust slowly, so that the TCC accumulator 22 does not interfere with proper operation of the leak detector 18.

FIG. 2 illustrates one arrangement incorporating the present invention. A submersible pump 40 of conventional construction is illustrated with a conduit 42 which extends down to a submerged pump in the reservoir tank (not shown). The tank is buried beneath the surface of the ground , which is covered by a layer of pavement 41. A box-like well 43 surrounds the pump 40 and associated apparatus, above the reservoir tank and is normally covered by a manhole cover (not shown). The discharge manifold for the pump 40 is contained within a housing 44, and the discharge outlet is connected through the leak detector valve to the line 20. The leak detector diaphragm housing 18 is mounted on top of the pump housing 44. The housing 44 has a port 46, called the line test port, which is in direct communication with the line 20.

The TCC accumulator 22 is connected to the port 46 by the line 32, and vented to the tank by means of the line 36. The operation of the TCC accumulator 22 is the same as described in connection with FIG. 1. It is shown inverted , to illustrate that it may be mounted in any attitude. The spring 28 is installed with an initial preload sufficient to maintain a discharge pressure slightly greater than 1 psi in its most extended or relaxed condition. The required spring constant depends on the installed attitude, because of the weight of the piston 26. Alternatively, opposed compression coil springs may be employed on both sides of the piston, selected with spring constants which supply forces which are large in relation to the weight of the piston 26, but which differ so as to maintain the discharge pressure slightly more than 1 psi when the volume of the chamber 30 reaches a minimum, with a higher discharge pressure level somewhat below the outlet pressure of the pump 12, when the volume is larger. A second spring 29 is shown in FIG. 1.

Referring now to FIG. 3, an alternative arrangement of the present invention is illustrated, which may be adapted to be installed anywhere along the fueling system line. It provides thermal contraction compensation up to a specific volume limit, defined by the size of the cylinder 24. The design of the apparatus of FIG. 3 allows for the connection of multiple accumulators 22 in parallel, to permit larger thermal contraction compensation capabilities by using multiple units. Proper leak detection operation is maintained.

In the apparatus of FIG. 3, the TCC accumulator is provided as a separate unit, and the flow control body 50 is provided as a second separate unit. The accumulator 22 has a cylinder 24, a piston 26, and a spring 28, which perform the functions described in connection with FIG. 1. Preferably, the cylinder construction of the piston 26 has a pair of grooves to accept O-rings or the like 52 to establish a fluid tight seal between the piston and the cylinder. A tube 54 is received or incorporated on a hub 56 at one end of the cylinder 24, and serves to guide the spring 28. The piston 26 is provided with a recess to receive and guide the other end of the spring 28. A rod 58 protrudes inwardly from the end wall of the cylinder 24, to establish a stop for the piston 26, to limit and define the maximum volume in the variable chamber 30 between the piston 26 and the right hand end of the cylinder. This chamber communicates with the flow control body 50 over a line 60, and the other end of the cylinder is vented to the tank 10 by a line 36. The vent line 36 is optional, and can be dispensed with and a plug installed if preferred, in which case the spring 28 may be replaced with a spring of lighter spring constant, or eliminated all together, provided the chamber within the cylinder 24 to the left of the piston 26 is filled with a compressible fluid such as air or the like having a pressure sufficient to produce a discharge pressure slightly greater than 1 psi when the piston 26 is in its extreme right hand position as illustrated in FIG. 3.

If it is desired to increase the capacity of the TCC accumulator, plural accumulators may be connected in parallel, all communicating with the line 60, to increase the total volume of the variable chamber 30. Alternatively, the length of the stop member 58 may be reduced, in order to increase the available volume 30. The flow control body 50 is connected to the line 32, which communicates with the fuel line (without a flow restrictor), and a manifold tube 62 is received within a bore in the flow control body 50, and held therein by a plug 64. The orientation of the manifold tube 62 may be reversed, to accommodate different installations, as described more fully hereinafter.

The interior of the line 32 communicates with passageways 66 and 68 to a chamber 70 at one side of the diaphragm 72. The diaphragm 72 is clamped at its periphery between the flow control body 50 and a cap member 71 which is secured to the body 50 by bolts or the like (not shown). The cap member 71 has a threaded aperture for receiving a threaded shaft 73, which contacts a stop member 75 on the outermost face of the diaphragm 72 to limit the outermost position of the diaphragm 72. A nut 77 is screwed onto the outside of the shaft 73 to hold it in fixed position relative to the cap 71 and diaphragm 72.

Another chamber 79 is adjacent the opposite face of the diaphragm 72, and a valve stem 74 is connected by the diaphragm stop 75 to the central portion of the diaphragm 72 on the innermost side, and is slidably received in the passageway 80. If desired, a seal can be incorporated on the valve stem 74. A check valve 82 interconnects the passageway 66 with the passageway 80, and a flow restrictor 84 is inserted into this flow path. The passageway 80 is aligned with the connection of line 60, which is connected to the TCC accumulator 22. A spring 76 urges the diaphragm 72 towards its right hand position as illustrated, and a passageway 85 connects the chamber 79 to a line 86 which may be used to vent the chamber 79 to the tank or may be closed with a plug (not shown).

The arrangement of FIG. 3, with the manifold tube 62 in the condition shown, is intended to be connected ahead of the leak detector in the line 14 (FIG. 1). In operation, when the pump 12 is turned on, the pressure in the line 14 rises, and fuel passes through the passageways 66 and 68 into the chamber 70, forcing the diaphragm 72 leftwardly (as illustrated in FIG. 4), and causing the valve stem 74 to seal off communication between the check valve 82 and the passageway 80. Fuel also enters the manifold 88 and passes from this manifold 88 through a flow restrictor 92 into a passageway 90, and through this passageway upwardly through the check valve 94 into the passageway 80. From the passageway 80, the fuel flows through a flow restrictor 96 and through the line 60 to fill the accumulator 22. This condition is shown in FIG. 4. The rate of flow is controlled by the combined effect of the series flow restrictors 92 and 96, and the pressure of fuel admitted to the TCC accumulator is determined by the force of the spring in the check valve 94. The check valve 94 prevents fluid from flowing out of the TCC chamber 30, and so the fuel in this chamber is trapped until the diaphragm 72 returns to its rightward position as illustrated in FIG. 3. This occurs when the pressure on the line 32 falls below a certain level, which is primarily determined by the initial preload and spring constant of the spring 76. When the fuel line pressure falls below this level, the diaphragm 72 moves rightwardly, and communication is open from the passageway 80 to the check valve 82. Fluid then flows from the TCC accumulator 22 through the series flow restrictors 96 and 84 and through the check valve 82, to maintain the pressure in the fuel line above the level which triggers the leak detector to recycle. The rate of flow is determined by the series flow restrictors 96 and 84. The spring of the check valve 82 is relatively weak, maintaining the pressure in the fuel line at approximately the same level as the fluid in the chamber 30.

The volume of the chamber 30 is reduced, in order to accommodate the thermal contraction of fuel in the fuel line, so that the leak detector maintains its valve open condition, and does not go into its flow restricting mode when the pump is subsequently turned on and the delivery nozzle is opened.

Figure 5:
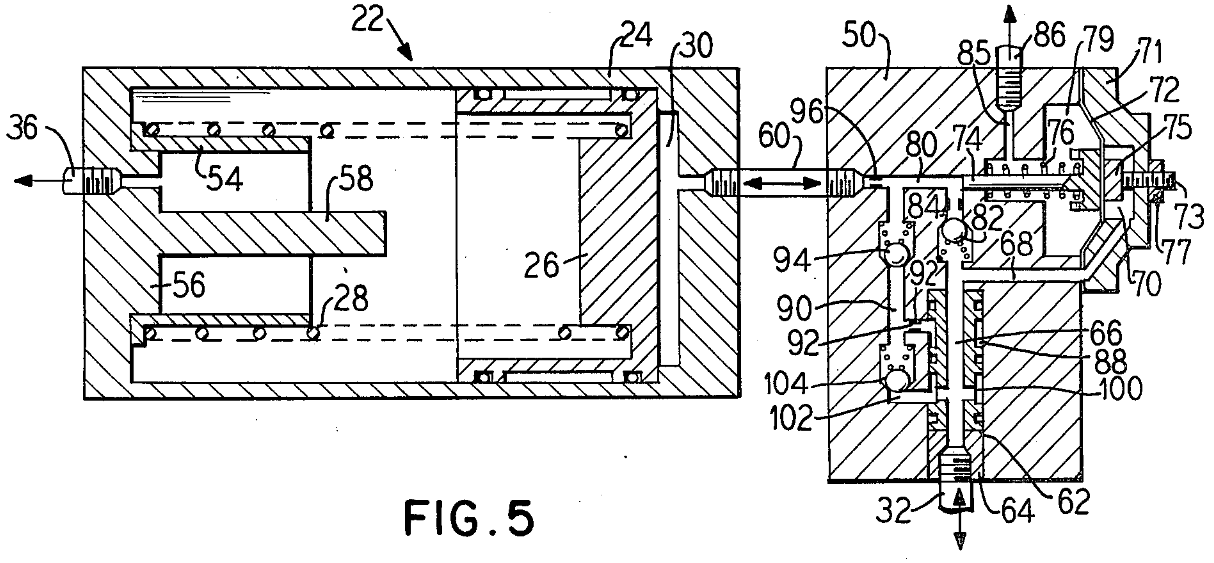
FIG. 5 is a cross-sectional view showing an alternative embodiment of the present invention.

The arrangement of FIG. 5 illustrates the apparatus when it is connected downstream of the leak detector, communicating with the line 20 instead of the line 14 as shown in FIG. 1. In this case, the filling of the TCC accumulator is delayed until after the pressure in line 20 exceeds the leak detector line test level, and this is accomplished by installing the manifold tube 62 in its opposite orientation (as shown), within its bore in the flow control body 50. In this case, the flow restrictor 92 is no longer in communication with the passageway 66, but instead, the passageway 66 is connected to a manifold 100, which is in communication with a passageway 102. A further check valve 104 is positioned between the passageways 102 and 90, and it has a stronger spring, requiring a higher pressure on the input line 32, before admitting fluid into the TCC accumulator 22. When this high pressure is reached, fluid enters the accumulator chamber 30 through the series check valves 104 and 94, and through the single flow restrictor 96. In other respects, operation is the same as described in connection with the arrangement of FIGS. 3 and 4. Namely, the diaphragm 72 moves to its right hand position in response to the low fuel line 20 (FIG. 1) pressures, allowing the TCC accumulator to discharge through the check valve 82 and maintain the fuel line 20 pressure above the minimum pressure established by the force pushing the piston 26 rightwardly.

The apparatus of FIG. 5 may be connected to the fuel line near the delivery nozzle 16, on the service station island. This facilitates installation in some cases, especially when access to the flow line between the pump and the leak detector is not readily available. If desired, the apparatus of FIG. 5 may also be connected to the fuel line between the pump and the leak detector.

In a typical example of the apparatus of FIGS. 3–5, in which the various passageways in the flow control body 50 are 8 mm or 0.3″ in diameter, and the diaphragm 72 has a diameter of about 4 cm or 1.5 inches, the force of the spring 76 on the diaphragm in its left hand position is about 4.5 Kg or 10 pounds, and the spring has a spring constant of about 4.5 kg per cm or 25 lbs. per inch. This allows the slide valve operated by the diaphragm 72 to open at about 0.4 kg/cm$^2$ or 6 p.s.i., travelling 5 mm or 0.2 inches so as to open the valve fully at 0.2 kgm per cm$^2$ or 3 psi. The flow restrictors 92 and 96 both have openings of about 6 mm or 0.25 in. in diameter, and the restrictor 84 has an opening of 2 mm or 0.08 in. in diameter. The check valves 82 and 94 each open at a pressure difference of about 0.01 kg/cm$^2$ or 0.1 psi, while the check valve 104 opens at about 0.8 kg/cm$^2$ or 12 psi. While the parameters given above illustrate the present invention, it will be understood that variation in the design of the accumulator may require adjustment in these parameters.

It will be apparent to those skilled in the art that various additions and modifications may be made in the apparatus of my invention without departing from the essential features of novelty thereof, which are intended to be defined and secured by the appended claims.

I claim as my invention:

1. In a fuel delivery system, incorporating a leak detector which functions to limit the rate of flow of said delivery system in response to a detected condition of fuel pressure in the delivery line, the combination comprising:
   - a temperature contraction compensation (TCC) accumulator connected with said delivery line, said accumulator having a variable volume adapted to hold a quanitity of fuel,
   - means including a flow path including a flow restrictor for reducing the volume of said accumulator at a predetermined low flow rate in response to temperature contraction of the fuel in said delivery line, and to maintain the pressure in said delivery line above a predetermined level,
   - and valve means directly responsive to the pressure in said delivery line, said valve means opening at about 0.4 kg/cm$^2$ to allow fuel to flow from said variable volume chamber into said delivery line in repsonse to the pressure in said delivery line being less than a predetermined level.

2. Apparatus according to claim 1, including a first check valve in parallel with said pressure operated valve, for permitting fuel to flow into said TCC accumulator from said delivery line irrespective of the condition of said pressure operated valve.

3. Apparatus according to claim 1, including a first check valve and a flow restrictor connected in series with said pressure operated valve for supporting a flow of the fluid from said TCC accumulator to said delivery line, when said pressure responsive valve is open, through said flow restrictor, said check valve blocking flow through said flow restrictor in the other direction.

4. Apparatus according to claim 3, including a second check valve and a further flow restrictor connected in parallel with said first check valve and flow restrictor, for supporting a flow of fluid from said fuel line into said TCC accumulator through said second flow restrictor while blocking flow in the opposite direction.

5. In a fuel delivery system, incorporating a leak detector which functions to limit the rate of flow of said delivery system in response to a detected condition of fuel pressure in the delivery line, the combination comprising:
   - a temperature contraction compensation (TCC) accumulator connected with said delivery line, said accumulator having a variable volume adapted to hold the quantity of fuel, means for reducing the volume of said accumulator in response to temperature contraction of the fuel in said delivery line, and to maintain the pressure in said delivery line above a predetermined level,
   - valve means responsive to the pressure in said delivery line, said valve mens opening to allow fuel to flow from said variable volume chamber into said delivery line in response to the pressure in said delivery line being less than a predetermined level,
   - a first check valve in parallel with said pressure operated valve, for permitting fuel to flow into said TCC accumulator from said delivery line irrespective of the condition of said pressure operated valve,
   - and including second and third check valves connected in series and said series arrangement being connected in parallel with said first check valve and said flow restrictor, for supporting a flow of fluid from said fuel line to said TCC accumulator through said series check valves blocking flow in the opposite direction.

* * * * *